(12) United States Patent
Sasaki et al.

(10) Patent No.: US 8,599,298 B2
(45) Date of Patent: Dec. 3, 2013

(54) REPRODUCTION APPARATUS, IMAGING APPARATUS, SCREEN DISPLAY METHOD, AND USER INTERFACE

(75) Inventors: Kayo Sasaki, Tokyo (JP); Miwako Yoritate, Tokyo (JP); Yoshimitsu Funabashi, Tokyo (JP); Shinichi Iriya, Kanagawa (JP); Motoki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 11/665,269

(22) PCT Filed: Oct. 11, 2005

(86) PCT No.: PCT/JP2005/018986
§ 371 (c)(1),
(2), (4) Date: Apr. 12, 2007

(87) PCT Pub. No.: WO2006/041171
PCT Pub. Date: Apr. 20, 2006

(65) Prior Publication Data
US 2008/0012954 A1   Jan. 17, 2008

(30) Foreign Application Priority Data
Oct. 13, 2004   (JP) .................................. 2004-298392

(51) Int. Cl.
*H04N 5/222*  (2006.01)

(52) U.S. Cl.
USPC .................................. 348/333.05; 348/333.11

(58) Field of Classification Search
USPC ................. 348/333.01–333.12, 231.2, 231.3, 348/231.5
See application file for complete search history.

(56) References Cited

U.S. PATENT DOCUMENTS

| | | | |
|---|---|---|---|
| 6,295,088 B1 * | 9/2001 | Tsukahara et al. | 348/333.06 |
| 6,538,698 B1 | 3/2003 | Anderson | |
| 6,629,104 B1 * | 9/2003 | Parulski et al. | 707/102 |
| 6,760,074 B1 * | 7/2004 | Maruyama et al. | 348/375 |
| 7,002,625 B2 * | 2/2006 | Takahashi | 348/231.2 |
| 2002/0033848 A1 * | 3/2002 | Sciammarella et al. | 345/838 |
| 2003/0084065 A1 * | 5/2003 | Lin et al. | 707/104.1 |
| 2003/0112357 A1 * | 6/2003 | Anderson | 348/333.05 |
| 2003/0154190 A1 * | 8/2003 | Misawa et al. | 707/1 |
| 2003/0169288 A1 * | 9/2003 | Misawa | 345/719 |
| 2004/0119845 A1 | 6/2004 | Kaku | |

(Continued)

FOREIGN PATENT DOCUMENTS

| | | |
|---|---|---|
| JP | 07-182366 | 7/1995 |
| JP | 10-254746 | 9/1998 |

(Continued)

*Primary Examiner* — Nelson D. Hernández Hernández
(74) *Attorney, Agent, or Firm* — Sherr & Jiang, PLLC (57) ABSTRACT

A desired image is quickly retrieved from many images that have been stored. Reproduced images are horizontally arranged on time axis. Horizontal lines are displayed above the plurality of images. The horizontal lines are delimited every image group such that images that belong to the same image group are visually identified. Dots are displayed on individual lines corresponding to representative images P11 and P12 that belong to individual image groups. In addition, photographed dates and times are displayed only on representative images P11 and P21 that belong to image groups. A plurality of reproduced images are simultaneously displayed on an LCD 13. Among these reproduced images, representative images are identifiably displayed. When a desired image is selected from reproduced images, left and right feed buttons of a cross key 27 are pressed and representative images that belong to individual image groups are selected. When a dial key 28 is rotated, a desired image is selected from images that belong to the selected image group.

18 Claims, 7 Drawing Sheets

(56) References Cited

U.S. PATENT DOCUMENTS

| | | | |
|---|---|---|---|
| 2004/0189687 A1* | 9/2004 | Yamamoto | 345/716 |
| 2004/0267793 A1* | 12/2004 | Sato | 707/100 |
| 2005/0108644 A1* | 5/2005 | Finke-Anlauff et al. | 715/721 |

FOREIGN PATENT DOCUMENTS

| | | |
|---|---|---|
| JP | 10-285520 | 10/1998 |
| JP | 2001-203973 | 7/2001 |
| JP | 2002-211049 | 7/2002 |
| JP | 2003-52004 | 2/2003 |
| JP | 2003-052004 | 2/2003 |
| JP | 2003-216621 | 7/2003 |
| JP | 2004-254053 | 9/2004 |
| WO | WO 02/082086 A1 | 10/2002 |
| WO | WO 02/082806 A1 | 10/2002 |

* cited by examiner

| TAG WITH RESPECT TO PHOTOGRAPHED CONDITION | TAG NAME | TAG |
|---|---|---|
| EXPOSURE TIME | Exposure Time | 33434 |
| F NUMBER | F Number | 33437 |
| EXPOSURE PROGRAM | Exposure Program | 34850 |
| SPECTRAL SENSITIVITY | Spectral Sensitivity | 34852 |
| ISO SPEED RATE | ISO Speed Ratings | 34855 |
| OPTO-ELECTRONIC CONVERSION FUNCTION | OECF | 34856 |
| SHUTTER SPEED | Shutter Speed Value | 37377 |
| APERTURE VALUE | Aperture Value | 37378 |
| BRIGHTNESS VALUE | Brightness Value | 37379 |
| EXPOSURE BIAS VALUE | Exposure Bias Value | 37380 |
| LENS MINIMUM F NUMBER | Max Aperture Value | 37381 |
| SUBJECT DISTANCE | Subject Distance | 37382 |
| METERING MODE | Metering Mode | 37383 |
| LIGHT SOURCE | Light Source | 37384 |
| FLASH | Flash | 37385 |
| LENS FOCAL LENGTH | Focal Length | 37386 |
| FLASH INTENSITY | Flash Energy | 41483 |
| SPATIAL FREQUENCY RESPONSE | Spatial Frequency Response | 41484 |
| RESOLUTION OF WIDTH OF FOCAL PLANE | Focal Plane X Resolution | 41486 |
| RESOLUTION OF HEIGHT OF FOCAL PLANE | Focal Plane Y Resolution | 41487 |
| UNIT OF RESOLUTION OF FOCAL PLANE | Focal Plane Resolution Unit | 41488 |
| SUBJECT LOCATION | Subject Location | 41492 |
| EXPOSURE INDEX | Exposure Index | 41493 |
| SENSING METHOD | Sensing Method | 41495 |
| FILE SOURCE | File Source | 41728 |
| SCENE TYPE | Scene Type | 41729 |
| CFA PATTERN | CFA Pattern | 41730 |

Fig. 2B

| TAG WITH RESPECT TO STRUCTURE OF IMAGE DATA | TAG NAME | TAG |
|---|---|---|
| IMAGE WIDTH | Image Width | 256 |
| IMAGE HEIGHT | Image Length | 257 |
| DEPTH OF BITS OF IMAGE | Bits Pre Sample | 258 |
| COMPRESSION TYPE | Compression | 259 |
| PIXEL STRUCTURE | Photometric Interpretation | 262 |
| PIXEL DIRECTION | Orientation | 274 |
| NUMBER OF COMPONENTS | Samples Per Pixel | 277 |
| ARRANGEMENT OF IMAGE DATA | Planar Configuration | 284 |
| STRUCTURE OF YCC PIXEL (SUB SAMPLING OF C) | YCbCr Sub Sampling | 530 |
| STRUCTURE OF YCC PIXEL (POSITIONING OF Y AND C) | YCbCr Positioning | 531 |
| RESOLUTION OF WIDTH OF IMAGE | X Resolution | 282 |
| RESOLUTION OF HEIGHT OF IMAGE | Y Resolution | 283 |
| UNIT OF RESOLUTION OF WIDTH AND HEIGHT OF IMAGE | Resolution Unit | 296 |

REPRODUCTION APPARATUS, IMAGING APPARATUS, SCREEN DISPLAY METHOD, AND USER INTERFACE

CROSS-REFERENCE TO RELATED APPLICATIONS

This application is a national phase application of International Application No. PCT/JP2005/018986, filed Oct. 11, 2005, and claims the priority of Japanese Application No. 2004-298392, filed Oct. 13, 2004, the content of all of which is incorporated herein by reference.

TECHNICAL FIELD

The present invention relates to a reproduction apparatus, an imaging apparatus, a screen display method, and a user interface that are applicable to for example an electronic camera and that allow a photographed image to be easily retrieved.

BACKGROUND ART

Electronic cameras of recent years can record many images to a record medium. Thus, it is becoming bothersome to retrieve a desired image from many images that have been photographed and recorded. In related art, an index display function, a calendar display function, a folder display function, and so forth that allow many images to be efficiently checked on a screen are known.

The index display function is a function of successively displaying many images recorded on a record medium on an index screen that is a multiply segmented screen. The calendar display function is a function of reducing images every photographed year, month, or day and displaying the reduced images on one screen. The folder display function is a function of reducing images contained in a folder and displaying the reduced images.

However, the index display function simply displays a plurality of images of many images on one screen. In the calendar display function, if there are many images photographed on the same date, retrieval efficiency deteriorates. The folder display function necessitates photographed images to be separately recorded in folders in advance. A method of categorizing image data of moving image data as groups is described in Japanese Patent Application Laid-Open No. HEI 10-254746. In this related art, as a method of categorizing image data as groups, image data are categorized as groups on the basis of photographed locations and photographed times.

Japanese Patent Application Laid-Open No. HEI 10-254746 describes that top images of individual groups are multi-segment displayed. By designating a desired image from those, a group is selected and image data registered to the group are successively reproduced.

In the display method described in Japanese Patent Application Laid-Open No. HEI 10-254746, photographed images are hierarchically categorized as groups. The user browses representative images of individual groups, designates his or her desired group from the representative images, and then selects his or her desired image in the designated group. However, with representative images, the user is not able to easily know other images in the groups. Thus, it is thought that the related art is not user-friendly to retrieve a desired image from many images.

DISCLOSURE OF THE INVENTION

Thus, an object of the present invention is to provide a reproduction apparatus, an imaging apparatus, a screen display method, and a user interface that allow a desired image to be easily retrieved from many photographed images.

To solve the foregoing problem, the present invention is a reproduction apparatus which reproduces a plurality of images from a record medium. The reproduction apparatus includes a process means, a display means, and an input means. The process means divides a plurality of images recorded in the record medium into image groups based on photographed conditions. The display means displays a plurality of reproduced images. The input means accepts an operation input from a user. The display means successively displays a representative image which belongs to each of the plurality of image groups and images chronologically adjacent to the representative image or images which belong to image groups which are adjacent to the image group to which the representative image belongs. The input means is capable of performing a first feed operation of successively selecting representative images which belong to the plurality of image groups and a second feed operation of successively selecting a plurality of images which belong to each of the plurality of image groups.

The present invention is an imaging apparatus. The imaging apparatus includes an image capturing means, a record means, and a reproduction means. The image capturing means captures an image of a subject. The record means records an image captured by the image capturing means. The reproduction means reproduces a plurality of images from the record means. The imaging apparatus also includes a process means, a display means, and an input means. The process means divides a plurality of images recorded in the record medium into image groups based on photographed conditions. The display means displays a plurality of reproduced images. The input means accepts an operation input from a user. The display means successively displays a representative image which belongs to each of the plurality of image groups and images chronologically adjacent to the representative image or images which belong to image groups which are adjacent to the image group to which the representative image belongs. The input means is capable of performing a first feed operation of successively selecting representative images which belong to the plurality of image groups and a second feed operation of successively selecting a plurality of images which belong to each of the plurality of image groups.

The present invention is a screen display method of a reproduction apparatus which displays a plurality of images recorded in a record medium. The plurality of images recorded in the record medium are divided into image groups based on photographed conditions. A representative image which belongs to each of the plurality of image groups and images chronologically adjacent to the representative image or images which belong to image groups which are adjacent to the image group to which the representative image belongs are successively displayed. The representative image and the plurality of images are changed depending on whether a first feed operation of successively selecting representative images which belong to the plurality of image groups or a second feed operation of successively selecting a plurality of images which belong to each of the plurality of image groups is performed.

The present invention is a user interface for a reproduction apparatus which reproduces a plurality of images recorded in a record medium. The plurality of images recorded in the record medium are divided into image groups based on photographed conditions. A representative image which belongs to each of the plurality of image groups and images chronologically adjacent to the representative image or images which belong to image groups which are adjacent to the image group to which the representative image belongs are successively displayed. A first feed operation of successively selecting representative images which belong to the plurality of image groups and a second feed operation of successively selecting a plurality of images which belong to each of the plurality of image groups are performed.

BEST MODES FOR CARRYING OUT THE INVENTION

Figure 1:
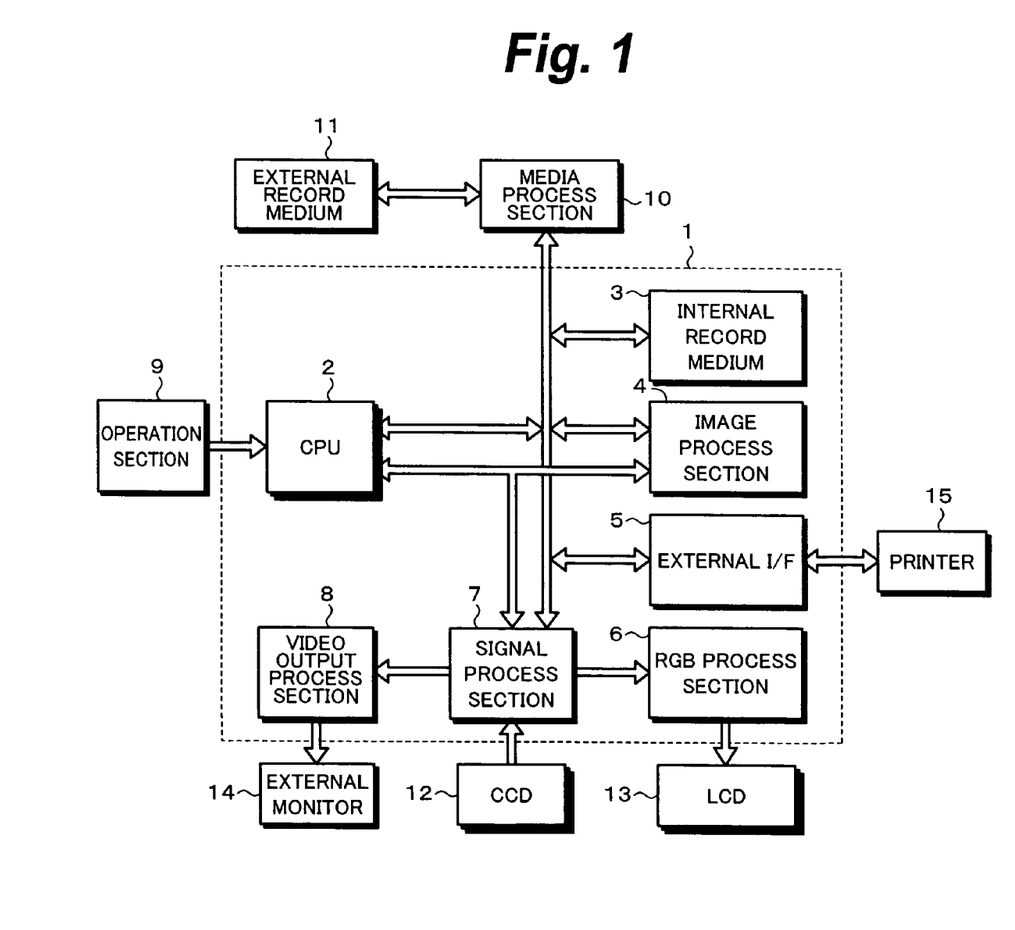
FIG. 1 is a block diagram showing a structure of an imaging apparatus according to an embodiment of the present invention.

Next, with reference to the accompanying drawings, an embodiment of the present invention will be described. FIG. 1 shows an example of a structure of a digital camera according to an embodiment of the present invention. This embodiment is based on a standard for current regular digital cameras defined by JEITA (Japan Electronics and Information Technology industries Association).

In other words, this embodiment is based on standards for DCF (Design rule for Camera File System) and Exif (Exchangeable image file format for digital still camera). The JPEG file format defines an area for an application marker segment, in which intrinsic information of an application is stored. In the Exif file format, unique information of Exif is stored in this area.

In FIG. 1, a section 1 surrounded by dotted lines represents a process section controlled by a CPU (Central processing Unit) 2. The process section 1 is composed of an internal record medium 3, such as a RAM, an image process section 4, an external interface 5, an RGB process section 6, a signal process section 7, and a video output process section 8. Connected to the CPU 2 is an operation section 9. A signal corresponding to an operation of for example a shutter disposed in the operation section 9 is supplied to the CPU 2.

A captured image signal is compressed according to JPEG (Joint Photographic Exports Group) system or the like. The compressed data are recorded to an external record medium 11 through a media process section 10. The external record medium 11 is a writable optical disc, a memory card, or the like.

Supplied to the signal process section 7 is a captured image signal from a CCD (Charge Coupled Device) 12 as an image sensor. The signal process section 7 processes the captured image signal. In addition, regardless of whether or not an input has been made from the operation section 9, an image signal captured by the CCD 12 is output from the signal process section 7 and stored in the internal record medium 3. While a subject is being photographed, an image stored in the internal record medium 3 is continuously updated. Data that are written to and read from the internal record medium 3 are controlled by the CPU 2.

A captured image signal is supplied from the internal record medium 3 to the RGB process section 6 through the signal process section 7. A display signal generated by the RGB process section 6 is supplied to an LCD (Liquid Crystal Display) 13 as a display device. The LCD 13 is disposed for example on the rear of the camera body. The LCD 13 displays not only a captured image signal and an image signal supplied from the external record medium 11 through the media process section 10.

When the shutter of the operation section 9 is pressed, the image process section 4 converts the captured image signal stored in the internal record medium 3 into an image file according to for example the JPEG system. The image file is stored as data different from the captured image signal in the internal record medium 3. An image file read from the internal record medium 3 is stored in the external record medium 11 through the media process section 10 under the control of the CPU 2. Instead, the image file temporarily stored in the internal record medium 3 may be kept stored therein.

An image file is continuously updated and a reproduced image is displayed on the LCD 13. OSD data such as reduced images of recorded image data, icons, and so forth are superimposed with the reproduced image by the signal process section 7 and the superimposed image is displayed on the LCD 13. The OSD (On Screen Display) is a general term that represents a memory area and a mechanism that prepare data of icons or the like superimposed with a real time image captured from a camera.

When OSD data are created, latest image data are obtained from the external record medium 11. The obtained image data are converted into data having a size suitable for OSD by the image process section 4. Thereafter, the converted image data are stored in an OSD display area of the internal record medium 3. However, if there is an image having the OSD display size corresponding to the just photographed image in the internal record medium 3, it is not necessary to obtain data from the external record medium 11. The image process section 4 is controlled by the CPU 2 such that an image to be displayed is enlarged or reduced for example according to a key operation of the user for the operation section 9.

An analog color video signal outputted from the video output process section 8 is obtained from a video output terminal (not shown). When an external monitor 14 is connected to the video output terminal, images stored in the internal record medium 3 or the external record medium 11 can be displayed on the external monitor 14. In addition, for example a printer 15 is connected to the external interface 5. With the printer 15, images can be printed.

The operation section 9 includes a cross key. When tip portions of a cross-shaped operation portion of the cross key (referred to as left button, right button, up button, and down button) are pressed, the moving directions of the cursor is designated as upper, low, left, and right directions, respectively. The directional key may be an input device such as a dial, a roller, a track ball, or a touch panel other than the cross key. Instead of such mechanical structures, a GUI (Graphical User Interface) of which buttons or the like are operated on the display screen may be used.

Figure 2A:
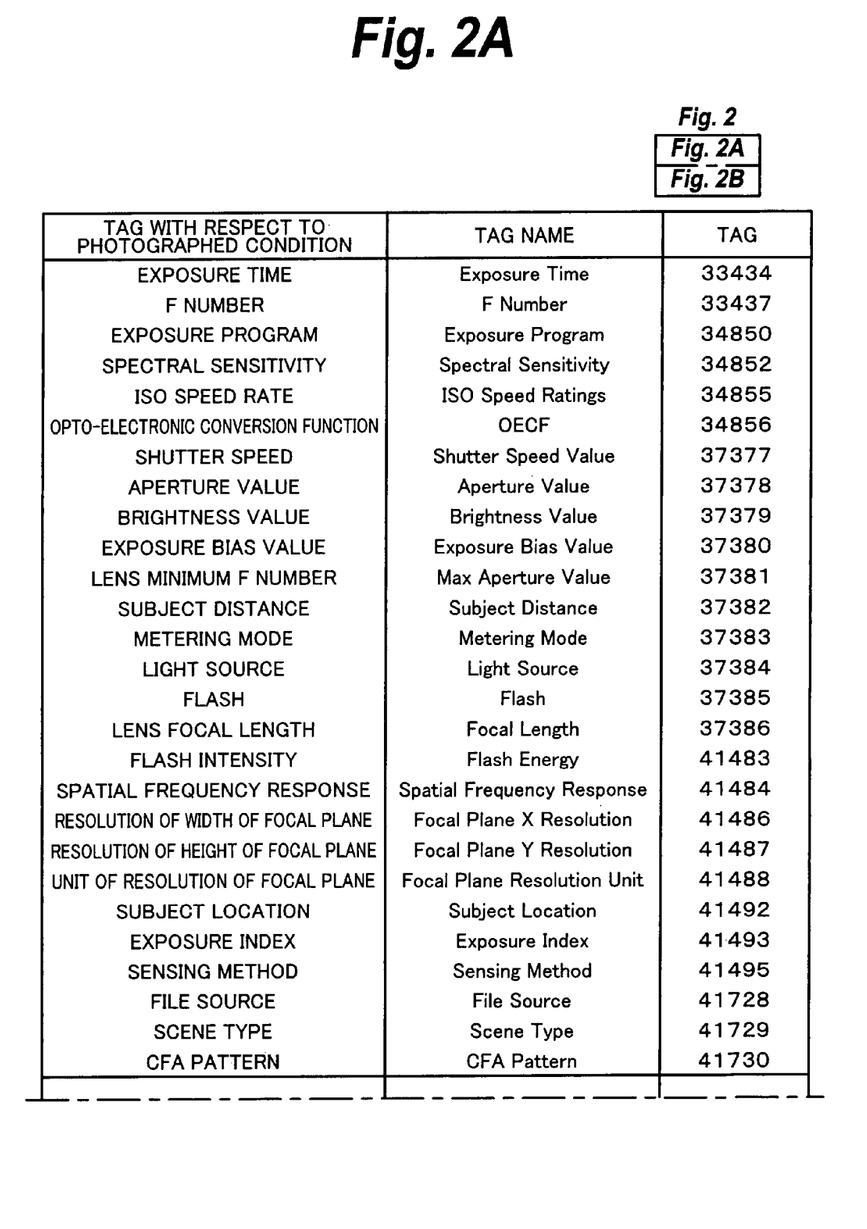
FIG. 2A and FIG. 2B are schematic diagrams describing tags with respect to photographed conditions according to an embodiment of the present invention.
Figure 2B:
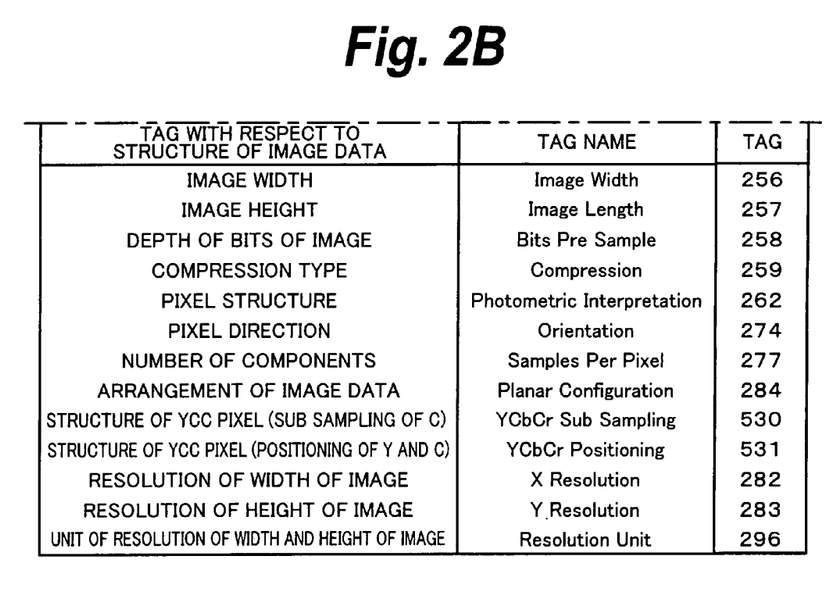

In the Exif file format, additional information of Exif IFD shown in FIG. 2A and FIG. 2B is defined. FIG. 2A and FIG. 2B list an excerpt of the additional information as tags with respect to photographed conditions and tags with respect to the structure of image data. In FIG. 2A and FIG. 2B, only meanings, tag names, and tags (2 bytes) of Exif IFD are listed; however, for simplicity, their types and counts are omitted.

Photographing setting information of an image stored in the internal record medium 3 or the external record medium 11 is contained in an image file in the Exif file format. This photographing setting information is read to a nonvolatile memory (RAM) portion of the internal record medium 3. When the photographing setting information relates to setting for a lens, a camera lens control section of the signal process section 7 controls the lens corresponding to the setting such that an image is displayed on the LCD 13 corresponding to the setting of the lens.

According to the present invention, many images are delimited in the unit of a so-called event based on photographed conditions for example photographed locations such that desired images can be efficiently retrieved from or checked in many images stored in a photographed order in the internal record medium 3 or the external record medium 11. In each event, a plurality of images are arranged based on photographed dates and times. Events may be set based on time information for example in the unit of one day or one week.

Figure 3:
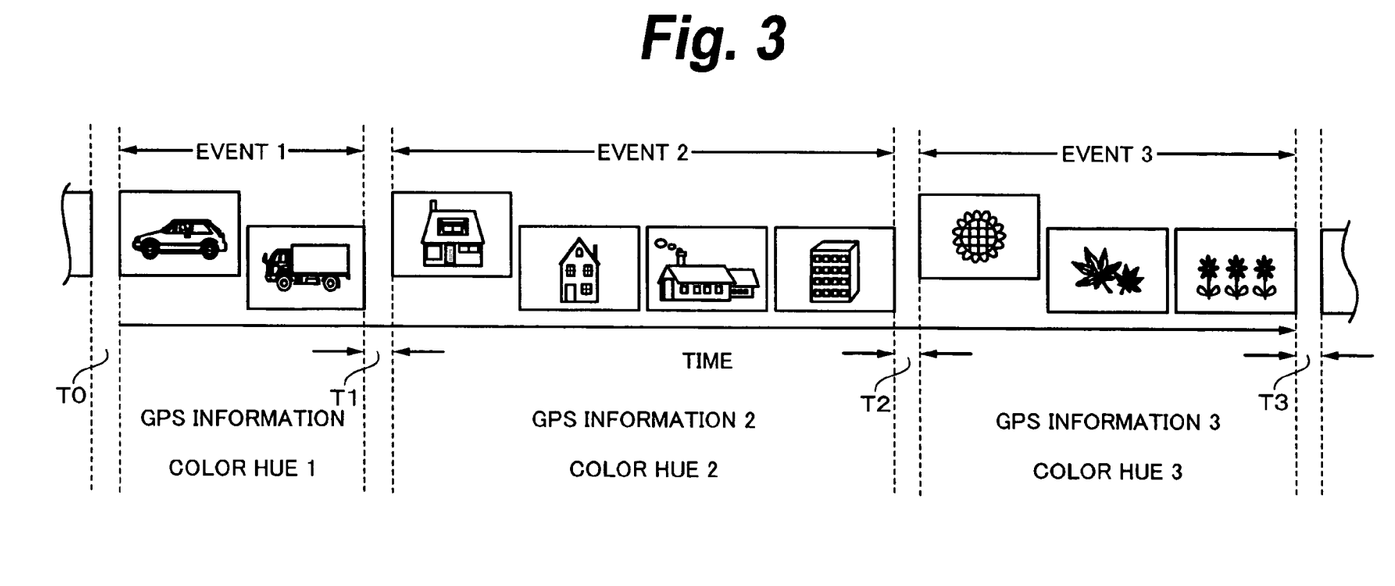
FIG. 3 is a schematic diagram describing an arrangement of events and images on time axis according to an embodiment of the present invention.

FIG. 3 shows a concept of events. In FIG. 3, a total of nine images are arranged on time axis. In FIG. 3, images photographed at three different locations are illustrated. A process of categorizing photographed images as events based on different photographed locations is automatically performed by the image process section 4 (refer to FIG. 1) when their subjects are photographed. As an example of categorizing an image as an event, a state of which no subject is photographed for a preset time or longer is detected as an event delimitation. Photographed date and time, namely date and time on and at which an original image was created, are described with tags of Exif IFD. Thus, when an interval of photographed images is longer than the preset time, it can be determined that the photographed locations have changed. As a result, this state can be detected as an event delimitation.

Next, the process of categorizing an image as an event based on the length of the interval of photographed images will be more specifically described. Detected events are categorized based on event identification information. Information with which continuities of events are managed is stored in the RAM of the internal record medium 3 instead of an image file. The CPU 2 reads time information of photographed dates and times of image files of many images stored in the internal record medium 3 or the external record medium 11 to the RAM portion of the internal record medium 3.

The CPU 2 compares time information that has been previously read and later time information that has been just read and detects the time difference therebetween. The CPU 2 compares the preset time and the detected time difference. When the time difference is larger than the preset time, the CPU 2 detects the time difference as an event delimitation. In FIG. 3, T1 and T2 represent event delimitations detected in such a manner. When the time difference is smaller than the preset time, two image files are kept together as one event. Event identification information of each image file is stored in the RAM of the internal record medium 3. For example, a table that correlates file names, which identify images, and event numbers is created as event identification information. Instead, event identification information may be stored in the RAM of the CPU 2.

As another method of categorizing images as events, location information as GPS (Global Positioning System) information is used. When a digital camera has a GPS function, the GPS information can be obtained. The obtained GPS information is described with a tag of Exif IFD.

Instead, photographed images may be categorized as events based on color hues of the images. Since the color hues of images tend to be identical depending on photographed locations, the images can be categorized as events based on their color hues. Instead, images may be categorized as events based on at least two factors of length of the interval of photographed images (namely, the duration of non-photographed state), GPS information, and color hues of images.

Figure 4:
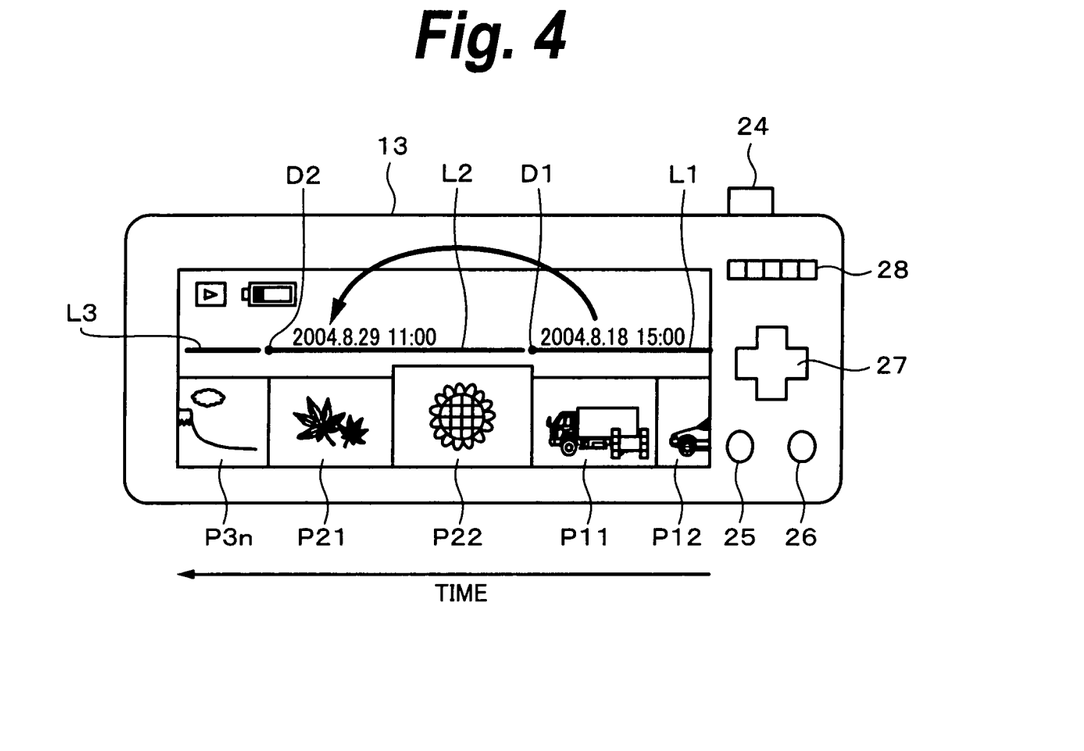
FIG. 4 is a schematic diagram showing an example of a screen display in the case that a wide LCD is used.

FIG. 4 describes images displayed on the LCD 13 according to an embodiment of the present invention. The LCD 13 can be a regular LCD having an aspect ratio of 4:3 or a wide LCD having an aspect ratio of 16:9 or 8:3. However, it is preferred that the LCD 13 be capable of displaying two or more reproduced images. FIG. 4 shows the case of which a wide LCD is used as the LCD 13. When necessary, images are read from the external record medium 11 and stored in the internal record medium 3. Image data are read from the external record medium 11, decoded and size-reduced by the image process section 4, and then stored in the internal record medium 3.

Reproduced images P11, P12, P21, P22, and P3n are arranged horizontally on time axis. Arrows in FIG. 4 represent the direction on time axis on which time passes from past to present. The direction on time axis on which reproduced images are successively displayed may be reversed. A plurality of images arranged on one axis in the order of photographed dates and times are arranged in the horizontal direction, vertical direction, or diagonal direction on the display screen of the LCD 13. In this embodiment, a plurality of images are arranged in the horizontal direction.

Reference numeral 24 represents a shutter button. Reference numeral 25 represents a menu button. Reference numeral 26 represents a delete button. Reference numeral 27 represents a cross key. Reference numeral 28 represents a dial key.

Displayed above the plurality of images arranged in the horizontal direction are horizontal lines L1, L2, and L3 delimited every event. Horizontal lines L1, L2, and L3 visualize images that belong to the same events. Images P11 and P12 belong to the same event. Images P21 and P22 belong to the same event. Image P3n is an n-th image that belongs to another event. The display method is not limited to such an example as long as images that belong to the same events are visualized. For example, horizontal lines may be displayed below a plurality of images. Instead, images that belong to the same event may be surrounded by windows having the same color. Instead, the same icon may be superimposed with images that belong to the same event. For example, the latest image (hereinafter referred to as a top image) that belong to each event is designated as a representative image. Dots are displayed on horizontal lines corresponding to representative images P11 and P21. In addition, photographed dates and times are displayed only on representative images P11 and P21. In such a manner, a plurality of reproduced images are simultaneously displayed on the LCD 13. Among these reproduced images, representative images that belong to individual events are identifiably displayed. Representative images are not limited to top images that belong to individual events. Instead, representative images can be suitably designated based on additional information of Exif IFD. Instead, the user may select desired images as representative images.

When representative images are designated, the user can have a cue to retrieve his or her desired image based on his or her memory of each event. In addition, it is preferred that a representative image and other images be arranged on time axis such that the user can simultaneously see representative image and reproduced images that are adjacent thereto and that belong to the same event or reproduced images that belong to another event.

In this embodiment of the present invention, the user is provided with intuitional and clear operability unlike with a hierarchical structure in which only representative images are displayed, a group is selected with a representative image, and images of the selected group are displayed. In addition, images photographed on the same date are categorized as a plurality of events depending on the photographed locations such as airport, staying place in trip, restaurant, and so forth, the user can more easily estimate the position of his or her desired image based on his or her memory with representative images than the method of which images are categorized as groups simply based on photographed dates.

Left and right feed buttons of the cross key 27 (or a left or right feed button) are used to feed events. The event feed is an operation of which a reproduced image is jumped from one representative image to another representative image. For example, in the case that a representative image is a top image, when the right feed button is pressed, a reproduced image is jumped to a top image that belongs to the just older event is reproduced. When the left feed button is pressed, a reproduced image is jumped to a top image of the just newer event is reproduced.

When the dial key 28 is rotated, an image that belongs to each event is fed (hereinafter, sometimes referred to as the frame feed). When the dial key 28 is rotated clockwise, a row of reproduced images is fed leftward. When the dial key 28 is rotated counterclockwise, a row of reproduced images is fed rightward. The relationship of the rotation directions of the dial key 28 and the frame feed directions may be reversed from the foregoing example. Instead, the event feed may be preformed by the dial key 28, whereas the frame feed may be performed by the cross key 27.

The event feed and the frame feed may be performed by the same key rather than independent keys. For example, the dial key 28 may be able to be pressed. In this case, when the dial key 28 is pressed, the event feed is performed. When the dial key 28 is rotated, the frame feed is performed. Instead, while the center portion of the cross key 27 is being pressed, the event feed is performed at a predetermined interval. The frame feed for each event may be performed by the left and right feed buttons.

In the case that these operations are accomplished by a GUI, when the cursor is placed at a date and an event feed key, for example, the left or right feed button of the cross key 27 is operated, the event feed of which a reproduced image is jumped to a top image that belongs to the newer or older event can be performed leftward or rightward. Specifically, in the reproduction mode for which images are reproduced, a plurality of images including an image that has been just photographed are displayed on the LCD 13. The cursor is placed on the just photographed image. In this state, when the left or right reproduction button is operated, a reproduced image is jumped to a top image that belongs to an adjacent event. When the left or right feed button is pressed several times, a reproduced image is jumped to a top image that belongs to an event corresponding to the number of times the left or right feed button was pressed. When the frame feed key, which causes images to be fed one by one, is operated, the cursor can be moved to an image adjacent to the top image. The GUI may be combined with the touch panel.

Figure 5:
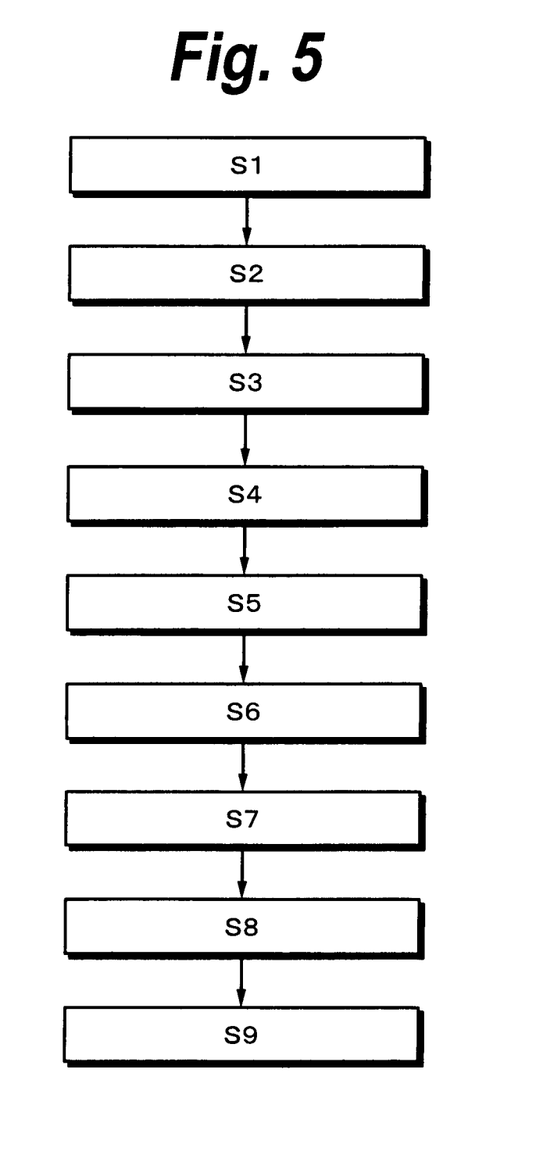
FIG. 5 is a flow chart describing an example of an operation according to an embodiment of the present invention.
Figure 6:
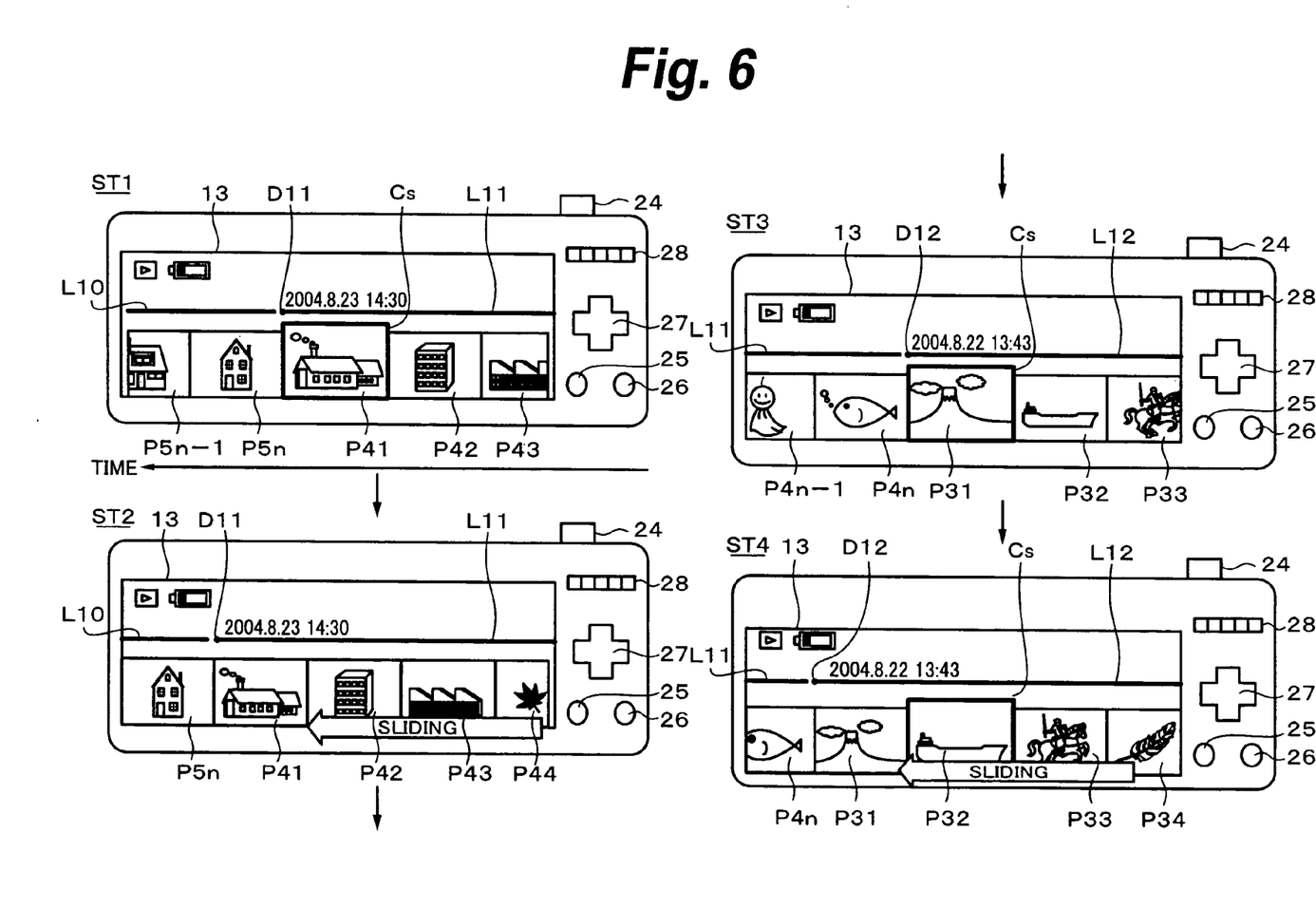
FIG. 6 is a schematic diagram showing a transition of display screens in an event feed operation and a frame feed operation in the case that a wide LCD is used.

FIG. 5 is a flow chart showing an operation accomplished by a GUI. FIG. 6 is a schematic diagram showing a transition of images. Arrows at ST1 to ST4 shown in FIG. 6 represent the direction on time axis on which time passes from past to present. When the reproduction operation is started, an image that has been just photographed and adjacent images are displayed on the LCD 13. The cursor is placed on the image that has been just photographed (at step S1).

At step S1, the display screen of the LCD 13 is represented as ST1 in FIG. 6. The cursor represented as Cs is placed at image P41 that has been just photographed. Image P41 is a top image that belongs to one event represented by line L11. Black dot D11 is displayed on line L11. In addition, photographed date and time are displayed above image P41.

At step S2, when the event feed key (for example, the right feed button of the cross key 27) is operated one time, the cursor Cs is placed at a top image that belongs to the just older event on the screen.

As shown in FIG. 6, when the cursor Cs is placed at image P41, the right feed button of the cross key 27 is pressed. Display screen ST3 on which the cursor Cs is placed at top image P31 that belongs to the just older event is displayed through transition display screen ST2. Transition display screen ST2 is an animation transition screen on which a row of images horizontally arranged on time axis slides leftward to display screen ST3. Transition display screen ST2 is momentarily displayed. With such an animation transition, the user can easily recognize that the event feed is being performed. On display screen ST3, line L12 represents a row of images that compose (belong to) the just older event. Image P31 represents a top image that belongs to the event.

In FIG. 6, on display screen ST3, the dial key 28 is rotated for example clockwise. Display screen ST4 displays the state of which a row of a plurality of images slides leftward. In this case, an animation transition of which the cursor Cs is fixedly placed nearly at a center position of display screen ST4 and the row of the plurality of images slides leftward is performed.

In the flow chart shown in FIG. 5, at step S3 (on display screen ST3), the cursor Cs is placed at a top image that belongs to the just older event. Thereafter, the event feed key is operated several times (at step S4). The cursor is placed at a top image that belongs to an event older than the current event by events corresponding to the number of times the event feed key was pressed. At step S6, the frame feed is performed frame by frame on display screen ST4. The cursor is placed at the adjacent image (at step S7).

At step S8, when an OK button, for example the center position of the cross key 27, is pressed, an image to be selected is decided. When an image to be selected has been decided, various types of image processes can be performed on the menu for the selected image. For example, the selected image is enlarged or reduced. Instead, the selected image can be deleted by the delete button 26.

The present invention is not limited to the foregoing embodiment. Instead, various modifications and changes may be made without departing from the spirit of the present invention. For example, the present invention is not limited to a digital camera that records still images. Instead, the present invention can be applied to a photographing apparatus that records moving images and a photographing apparatus that records both still images and moving images. When a moving image is recorded, for example one photographing operation is delimited as one event.

As described above, according to this embodiment, a representative image that belongs to an image group and images chronologically adjacent thereto are successively displayed on time axis on a display means. A first feed operation of successively selecting reproduced images that belong to image groups and a second feed operation of successively selecting images that belong to the selected image group can be performed. Thus, according to the present invention, a desired image can be easily retrieved from many images in comparison with a hierarchical operation of which image groups are selected based on only representative images and images that belong to the selected image group are selected.

DESCRIPTION OF REFERENCE NUMERALS

1 PROCESS SECTION
2 CPU
3 INTERNAL RECORD MEDIUM
9 OPERATION SECTION
11 EXTERNAL RECORD MEDIUM
12 CCD
13 LCD
24 SHUTTER BUTTON
27 CROSS KEY
28 DIAL KEY
S1 DISPLAY CURSOR AT JUST PHOTOGRAPHED IMAGE.
S2 OPERATE EVENT FEED KEY.
S3 DISPLAY CURSOR AT TOP IMAGE THAT BELONGS TO JUST OLDER EVENT
S4 OPERATE EVENT FEED KEY SEVERAL TIMES.
S5 DISPLAY CURSOR AT TOP IMAGE THAT BELONGS TO OLDER EVENT THAN CURRENT EVENT BY SEVERAL EVENTS.
S6 OPERATE FRAME FEED KEY.
S7 DISPLAY CURSOR AT ADJACENT IMAGE.
S8 PRESS OK BUTTON.
S9 FRAME DISPLAY SCREEN

The invention claimed is:

1. A reproduction apparatus which reproduces a plurality of images, comprising:
a process section for automatically dividing, at a time the images are being captured, a plurality of images with a time associated with each image into image groups based on photographed conditions, at least one of which photographed conditions relates to a preset length of time between photographed images, wherein each one of the image groups represents a respective event and the plurality of images are divided into the image groups by detecting, as event delimitations, all length of time differences between photographed times of chronologically adjacent images that are larger than a preset time;
a display interface for simultaneously displaying (i) a plurality of reproduced images belonging to a first one of the image groups and (ii) a plurality of reproduced images belonging to a second one of the image groups; and
an operation section for accepting an operation input from a user,
wherein the display interface successively displays a representative image belonging to each respective image group along with a photographed time of the representative image, the representative image of each respective image group being successively displayed by jumping a focus directly between representative images of adjacent image groups, the representative image having been selected by the user for each image group from among images belonging to each respective image group for use as a representative image for that respective image group, and when any of the image groups contain at least two images, displaying at least a second image from the any of the image groups containing at least two images, the second image chronologically adjacent to the representative image,
wherein the operation section is capable of performing a first feed operation of successively selecting representative images which belong to the plurality of image groups by jumping the focus directly between the representative images of adjacent image groups and a second feed operation of successively selecting a plurality of images which belong to each of the plurality of image groups, the first and second feed operations both capable of being performed directly from the display interface, and
wherein when the operation section performs the first feed operation, the display interface performs an animated transition between a screen displaying one or more of the plurality of reproduced images belonging to the first one of the image groups and a screen displaying one or more of the plurality of reproduced images belonging to the second one of the image groups.

2. The reproduction apparatus as set forth in claim 1, wherein the photographed conditions include photographed and times.

3. The reproduction apparatus as set forth in claim 1, wherein the photographed conditions include color hues of photographed images.

4. The reproduction apparatus as set forth in claim 1, wherein the display interface has a wide aspect ratio.

5. The reproduction apparatus as set forth in claim 1, wherein the display interface is capable of identifiably displaying the image groups.

6. The reproduction apparatus as set forth in claim 5, wherein the display interface displays lines which delimit the image groups and which are in parallel with a time axis.

7. The reproduction apparatus as set forth in claim 5, wherein the display interface surrounds the plurality of images with windows having colors corresponding to the image groups.

8. The reproduction apparatus as set forth in claim 5, wherein the display interface superimposes the plurality of images with icons corresponding to the image groups.

9. The reproduction apparatus as set forth in claim 1, wherein the display interface is capable of identifiably displaying a representative image which belongs to each of the image groups.

10. The reproduction apparatus as set forth in claim 1, wherein the operation section includes a cross key, and
wherein, when the cross key is pressed, the representative image or the plurality of images are successfully fed in a time axis direction or a reverse direction thereof.

11. The reproduction apparatus as set forth in claim 1, wherein the operation section includes a dial key, and
wherein, when the dial key is rotated, the representative image or the plurality of images are successfully fed in a time axis direction or a reverse direction thereof.

12. The reproduction apparatus as set forth in claim 1, wherein the photographed conditions include photographed locations.

13. The reproduction apparatus as set forth in claim 12, further comprising a Global Positioning System (GPS) locator, wherein the photographed locations are GPS locations obtained from the GPS locator.

14. The reproduction apparatus as set forth in claim 1, wherein the focus comprises a cursor that is placed on or associated with the representative image that the focus is jumped to.

15. The reproduction apparatus as set forth in claim 1, wherein the animated transition comprises an animation depicting a momentary sliding of the reproduced images horizontally across the displaying screen, beginning with a displaying of the one or more of the plurality of reproduced images belonging to the first one of the image groups and ending with a displaying of the one or more of the plurality of reproduced images belonging to the second one of the image groups.

16. An imaging apparatus including:

image capturing means for capturing an image of a subject;

record means for recording an image captured by the image capturing means and for recording a time that an image is recorded; and reproduction means for reproducing a plurality of images from the record means, the imaging apparatus comprising:

process means for automatically dividing, at a time the images are being captured, a plurality of images into image groups based on photographed conditions, at least one of which photographed conditions relates to a preset length of time between photographed images, wherein each one of the image groups represents a respective event and the plurality of images are divided into the image groups by detecting, as event delimitations, all length of time differences between photographed times of chronologically adjacent images that are larger than a preset time;

a display interface for simultaneously displaying (i) a plurality of reproduced images belonging to a first one of the image groups and (ii) a plurality of reproduced images belonging to a second one of the image groups; and input means for accepting an operation input from a user, wherein the display interface successively displays a representative image belonging to each respective image group along with a photographed time of the representative image, the representative image of each respective image group being successively displayed by jumping a focus directly between representative images of adjacent image groups, the representative image having been selected by the user for each image group from among images belonging to each respective image group for use as a representative image for that respective image group, and when any of the image groups contain at least two images, displaying at least a second image from the any of the image groups containing at least two images, the second image chronologically adjacent to the representative image, wherein the input means is capable of performing a first feed operation of successively selecting representative images which belong to the plurality of image groups by jumping the focus directly between the representative images of adjacent image groups and a second feed operation of successively selecting a plurality of images which belong to each of the plurality of image groups, the first and second feed operations both capable of being performed directly from the display interface, and wherein when the input means performs the first feed operation, the display interface performs an animated transition between a screen displaying one or more of the plurality of reproduced images belonging to the first one of the image groups and a screen displaying one or more of the plurality of reproduced images belonging to the second one of the image groups.

17. The imaging apparatus as set forth in claim 16, wherein the focus comprises a cursor that is placed on or associated with the representative image that the focus is jumped to.

18. The imaging apparatus as set forth in claim 16, wherein the animated transition comprises an animation depicting a momentary sliding of the reproduced images horizontally across the displaying screen, beginning with a displaying of the one or more of the plurality of reproduced images belonging to the first one of the image groups and ending with a displaying of the one or more of the plurality of reproduced images belonging to the second one of the image groups.

* * * * *